(12) United States Patent
Di Loreto

(10) Patent No.: US 8,372,479 B2
(45) Date of Patent: Feb. 12, 2013

(54) METHOD OF TREATING A CHAMBER HAVING REFRACTORY WALLS

(75) Inventor: Osvaldo Di Loreto, Boussu (BE)

(73) Assignee: FIB-Services International S.A., Luxembourg (LU)

( * ) Notice: Subject to any disclaimer, the term of this patent is extended or adjusted under 35 U.S.C. 154(b) by 475 days.

(21) Appl. No.: 12/667,807

(22) PCT Filed: Jul. 3, 2008

(86) PCT No.: PCT/EP2008/058561
§ 371 (c)(1),
(2), (4) Date: Feb. 19, 2010

(87) PCT Pub. No.: WO2009/004051

PCT Pub. Date: Jan. 8, 2009

(65) Prior Publication Data

US 2010/0196597 A1    Aug. 5, 2010

(30) Foreign Application Priority Data

Jul. 5, 2007    (BE) .................................. 2007/0335

(51) Int. Cl.
*B05D 3/02*    (2006.01)
(52) U.S. Cl. ........................................ 427/226; 427/227
(58) Field of Classification Search .................... 427/226
See application file for complete search history.

(56) References Cited

U.S. PATENT DOCUMENTS

| 4,146,379 A | * | 3/1979 | Copley et al. ................. 264/654 |
| 5,681,383 A | * | 10/1997 | Andoh et al. ............... 106/287.1 |
| 6,211,307 B1 | * | 4/2001 | Iwabuchi et al. ............. 525/477 |

FOREIGN PATENT DOCUMENTS

| EP | 994158 | 4/2000 |
| JP | 7-247189 | 9/1995 |

OTHER PUBLICATIONS

International Search Report in PCT/EP2008/058561 dated Oct. 17, 2008 (4 pages).

* cited by examiner

*Primary Examiner* — Michael Cleveland
*Assistant Examiner* — Robert Vetere
(74) *Attorney, Agent, or Firm* — McCracken & Frank LLC

(57) ABSTRACT

Method of treating a chamber having refractory walls, in which: a treatment composition, comprising at least one organosilicon compound and at least one hydrocarbide, is sprayed into said chamber, in the presence of oxygen; and said sprayed treatment composition is heated, the spraying in the presence of oxygen taking place in the closed chamber in which the treatment composition, in a predominantly liquid state, is atomized in the form of suspended particles, the method further including said at least one organosilicon compound decomposing to form a colloidal silica aerosol in the closed chamber, an overpressure being established therein, and a colloidal silica layer being spread over the refractory walls with, as a result of said overpressure, the colloidal silica penetrating into the microcracks.

12 Claims, No Drawings

METHOD OF TREATING A CHAMBER HAVING REFRACTORY WALLS

The present invention relates to a method for treating a chamber having refractory walls, comprising
  a spraying into said chamber, in the presence of oxygen, of a treatment composition comprising
    at least one organosilicon compound forming a majority portion by weight of said composition and
    at least one hydrocarbon capable, in the presence of oxygen, of giving rise, at a first temperature, to an exothermic reaction, and
  a rise in temperature of said sprayed treatment composition to at least said first temperature (see for example JP-07-247189).

Refractory walls, whether consisting of bricks or a monolithic material, display signs of degradation over time, in particular an increase in their permeability to gases and volatile compounds. This is the case in particular of coke oven walls, consisting of silica bricks, which bound the coking chambers and the heating flues. By thermal and mechanical fatigue, a network of microcracks is created within these walls, giving rise to the passage of organic compounds from the coking chamber to the flues, and from there to the stack (emission of volatile organic compounds—VOC—of which the limit content is regulated and monitored by the authorities).

Since these microcracks are too small to be individually identifiable, an overall treatment or approach must therefore be sought.

Japanese patent application JP-07-247189, describes a repair of a narrow space of a refractory wall by spraying a mixture of silane gas and oxygen or oxygen-containing gas at this place, in order to form a short flame, this mixture possibly containing a refractory forming powder and, optionally further, a hydrocarbon. This method has the drawback of using highly unstable silane gas, making it difficult to conceive of the possibility of applying it in practice in industry, due to its hazardous nature (explosive combustion).

In European patent EP-B-0708069, the method consists in spraying on the refractory wall, at a temperature between 500 and 1200° C., an aqueous suspension predominantly comprising sodium silicate, a lithium compound (Li hydroxide or carbonate), an alkali metal borate and a water-soluble compound of the sodium organosilicate type. By decomposition of the latter and reaction with the other constituents, a molten or vitreous layer is formed on the surface of the treated refractory wall, decreasing its permeability to gases.

International patent application PCT WO 03/076357 also teaches a method for the dry atomization of a powdery mixture comprising alkali metal silicates, alkali salts (Na or K carbonate), a hardening agent (Na borate or boric acid) and a finishing product (Na sulfate). The vitreous or ceramic layer thus produced improves the surface texture and is considered to plug the cracks.

In order to use one or the other of these three prior methods to plug the entire network of microcracks developed over the entire surface of the refractory walls concerned (about 100 square meters per coke oven chamber!), would entail a considerable task, particularly lengthy and difficult, especially in inaccessible areas. This is because in these methods, the only areas treated are those that are actually reached by the spray jet, and since the precise position of the microcracks is undetectable, a complete surface treatment is necessary. The treatment always takes place in the open chamber in order to enable the operator to visually observe the area of the wall that needs repair and to aim the spray nozzle at the right location.

An overall treatment applicable to the entire surface concerned by these microcracks is not provided in the prior art and consequently needs to be developed.

Coating compositions based on diorganopolysiloxane (EP-A-0994158) or silsesquioxane and polysilazane (U.S. Pat. No. 5,776,599) possibly in a hydrocarbon solvent, are also known, intended for cold application to substrates, in particular electronic components, and then heated to harden them.

To solve the abovementioned problems presented by the refractory walls of treatment chambers, it is the object of the invention to carry out a method as indicated at the beginning, in which
  the spraying in the presence of oxygen takes place in the closed chamber where the treatment composition, in a predominantly liquid state, is atomized in the form of suspended particles,
  and in that the method further comprises
    during said exothermic reaction, a decomposition of said at least one organosilicon compound with formation of a colloidal silica aerosol in the closed chamber and the establishment of an overpressure therein, and
    a spreading of a colloidal silica layer on the refractory walls of said chamber with, following said overpressure, penetration of the colloidal silica into the microcracks of the refractory walls.

Advantageously, this predominantly liquid composition is sprayed under pressure in a jet of oxygen or oxygen-containing gas into the chamber having refractory walls to be treated in order to form a suspension of liquid particles inside the volume of the chamber which is in the closed state. This spraying preferably takes place when the chamber has not been cooled, thereby achieving significant savings in energy. Said at least one hydrocarbon, in the presence of oxygen and at the high temperature of the chamber, preferably at least 800° C., will give rise to an exothermic reaction. This combustion causes the decomposition of the organosilicon compound(s) with formation in the closed chamber of the colloidal silica aerosol and the significant and rapid rise of the pressure therein. The colloidal silica aerosol then spreads itself throughout the volume of the chamber. A part of this colloidal silica is deposited on the surface of the refractory walls of the chamber and, by the effect of the overpressure therein, another part is entrained into the microcracks and deposited therein until they are plugged. The treatment is therefore comprehensive throughout the entire surface of the refractory walls and in all the microcracks that may exist therein.

In the context of the present invention, the expression whereby said at least one organosilicon compound forms a majority portion by weight of the treatment composition, means that the weight fraction of the organosilicon compound(s) is higher than that of any other component of the composition.

In the context of the present invention, the expression whereby the treatment composition is atomized in a predominantly liquid state, means that all its components are liquid or that the liquid component of this composition forms a weight fraction higher than that of any other component thereof. Advantageously, the composition will therefore be a liquid, but it may also be in the form of a liquid in which solid particles are in suspension.

According to an embodiment of the invention, said at least one organosilicon compound is at least partly soluble and said at least one hydrocarbon, preferably completely soluble.

It is thereby possible to adjust their proportions according to the spraying conditions (viscosity of the mixture) and combustion conditions (enthalpie) in order to optimize the formation yield at high temperature of the colloidal silica in the chamber to be treated. In the context of the present invention, high temperature preferably means a temperature higher than 800° C. Preferably, the kinematic viscosity of the composition according to the invention is lower than or equal to 100 cSt ($10^{-4}$ $m^2 \cdot s^{-1}$).

Thanks to the stability of the colloidal silica aerosol that it generates, this composition according to the invention can reach roughly all the surfaces concerned from one or more spray points, according to the volume of the chamber or of the reactor to be treated, representing a considerable gain in time (minimized production losses) and the certainty of having reached a maximum of the microcracks to be plugged.

The quantity of mixture to be used is significantly reduced thanks to the high silica conversion yield of the organosilicon compounds (for example the conversion of dimethylsiloxane to silica –80% by weight) and thanks to the high specific volume of the colloidal silica obtained, which is advantageously between 8 and 15 liters/kg.

The handling of the liquid mixture to be sprayed, although inflammable, is easy and readily controlled. The spraying can be carried out in the closed chamber via a hole made for example in the access door. The upper inspection hole is preferably used, or a charging hole, which usually exists in chambers having refractory walls, in particular coke ovens.

Preferably, said at least one organosilicon compound is selected from the group consisting of silicones, siloxanes, organosilicates and siloxysilicates having a linear, cyclic or branched chain, substituted or unsubstituted, polymerized or unpolymerized, and the mixtures thereof.

Advantageously, said at least one organosilicon compound is substituted by at least one alkyl or aryl group. Mention can be made for example of silicone oils or resins, alkylsiloxanes, preferably dimethylsiloxane, cyclosiloxanes, such as for example decamethylpentacyclosiloxane, siloxysilicates, such as in particular trimethylsiloxysilicate, or even organosilicates, such as tetraethylorthosilicate.

According to an advantageous embodiment of the invention, said at least one hydrocarbon is selected from aliphatic or aromatic hydrocarbons. Use can advantageously be made of aliphatic hydrocarbons having a linear or cyclic chain, with $C_5$ or higher, in particular $C_5$ to $C_{12}$, for example hexane, cyclohexane, heptane, or mixtures thereof. As aromatic hydrocarbons, mention can be made for example of benzene, toluene, xylene or mixtures thereof.

The treatment composition according to the invention may further comprise at least one additive commonly used in the treatment of refractory substrates, for example an additive such as talcum powder, lime, kaolinite or even silica fume. In the case of a solid additive, it is advantageously in the form of suspended particles in the predominantly liquid treatment composition.

A treatment composition according to the invention advantageously comprises a) 50 to 90%, preferably 70 to 80% by weight of said at least one organosilicon compound, b) 10 to 50%, preferably 20 to 30% by weight of said at least one hydrocarbon, and c) 0 to 20% by weight of at least one additive commonly used in the treatment of refractory substrates, the sum of the percentages of a) to c) giving 100% by weight.

The inventive method for treating or repairing a refractory wall constituting all or part of a chamber or an industrial reactor advantageously consists in spraying, at high temperature, using a spray nozzle supplied with a compressed gas containing oxygen, a combustible treatment composition according to the invention. Following the combustion of the hydrocarbon(s), the decomposed organosilicon compound(s) generate a colloidal silica aerosol which spreads in the entire volume of the closed chamber and is deposited on its walls.

This deposit of colloidal silica, initially thin, ultimately carpets the surface of the refractory wall as a porous plugging mass in the microcracks, into which it penetrates under the effect of the overpressure generated by the abovementioned exothermic reaction in a closed volume.

In the context of the present invention, oxygen-containing gas means a gas exclusively or partially containing oxygen, such as pure oxygen, technical grade oxygen, mixtures of oxygen and inert gas, and also air.

The first abovementioned temperature is preferably higher than 800° C., advantageously higher than 900° C.

According to an advantageous embodiment of the invention, the method comprises, after said spreading, a rise in temperature of the chamber to a second temperature higher than the aforesaid first temperature and densification of said spread colloidal silica layer. At this second temperature, for example, higher than 1000° C., preferably higher than 1100° C., the colloidal silica pad begins to densify to form a thinner coating adhering strongly to the surface of the refractory wall; similarly, the porous plugs in the microcracks are consolidated by densification.

According to a particular embodiment of the inventive method, the refractory walls of the chamber separate said chamber from an external volume and the method further comprises, during said spraying into the closed chamber, a pressurizing of this external volume to a pressure lower than the pressure of the chamber having refractory walls which favors said penetration of colloidal silica into said microcracks. The abovementioned penetration is then caused by the negative pressure established in the microcracks.

Said external volume frequently consists of at least one combustion compartment, such as for example heating flues of coking chambers of coke ovens, and the inventive method may then comprise, before said spraying, a pressurizing of said at least one combustion compartment to a pressure higher than that of the chamber having refractory walls and an inspection, therein, of the presence of brands issuing from said at least one combustion compartment via microcracks passing through said refractory walls. This prior step therefore serves to verify the existence of through microcracks and the need or the urgency of a treatment of the refractory walls. An identical process can be carried out after treatment to check the effectiveness thereof, which appears in the form of an absence of brands after treatment.

The invention also relates to a use of a treatment composition in a predominantly liquid state comprising at least one organosilicon compound forming a majority portion by weight of said composition and at least one hydrocarbon capable, in the presence of oxygen, of giving rise, at a first temperature, to an exothermic reaction, for treating the refractory walls of a chamber by spraying said composition into said chamber in the presence of oxygen.

The present invention will now be explained in greater detail with the help of examples given below which are non-limiting.

EXAMPLE 1

Comparative Example

In this first example, a compressed airgun is used to spray into the chamber of a furnace at 1000° C., a pure silicone oil of the dimethylsiloxane type having a viscosity of 350 cSt ($3.5 \cdot 10^{-4}$ m²·s⁻¹). The silicone aerosol spread is ignited with difficulty in the hot atmosphere of the chamber, even if spread against the refractory wall of the furnace. The formation of the colloidal silica aerosol is not uniform and the yield is low.

EXAMPLE 2

Comparative Example

Under the same spraying conditions as in example 1, a mixture consisting of 50% by weight of trimethylsiloxysilicate (silicone resin) and 50% by weight of decamethylpentacyclosiloxane (silicone oil) is spread, having a viscosity of 450 cSt ($4.5 \cdot 10^{-4}$ m²·s⁻¹). The formation of the colloidal silica aerosol is not uniform but the yield is already better than in the first example.

EXAMPLE 3

Under the same spraying conditions as in example 1, a composition consisting of 70% by weight of silicone resin (trimethylsiloxysilicate) and 30% by weight of an aromatic hydrocarbon (xylene) is spread, this composition having a viscosity of 10 cSt ($10^{-5}$ m²·s⁻¹). The formation of the colloidal silica aerosol is quite uniform this time, with a high yield and very good stability (no deposition); the colloidal silica thus formed adheres to the walls of the furnace and largely forms a layer several mm thick, and the cracks existing in this wall are colonized by this silica until they are plugged.

The temperature of the furnace was then raised to 1200° C. Upon reaching 1050° C., the silica begins to frit (densification), leading to the consolidation of the layer adhering to the walls and the silica plugs filling the cracks.

EXAMPLE 4

The same experiment was conducted in a coke oven chamber. The walls of the chamber were first inspected by forcing the flames to form at the through cracks by establishing an overpressure in the flues. Once the doors are closed, the composition of example 3 is sprayed, at a temperature of about 950° C., via an orifice at the bottom of the door, and the combustion of said composition has generated the colloidal silica aerosol and a sudden rise in pressure in the chamber. The colloidal silica is deposited as expected on the chamber walls, even in the most distant locations and including in the through cracks. To promote the penetration of the silica into the microcracks, the flues were also placed under negative pressure to create a suctioned current. At the end of the operation the adjustment to temperature of the chamber (1100° C.) for a few hours was observed to permit the consolidation of the silica deposit. The chamber was then inspected by repressurising the flues: 90% of the flames were eliminated by plugging the through cracks after a single treatment; if necessary, a second treatment can be carried out to improve this result or, in the case a crack with an accessible opening, another repair method can be adopted.

EXAMPLE 5

As in example 4, the mixture of example 3 was sprayed into a coke oven chamber, with the doors closed, but this time using technical grade oxygen as the spray gas.

This procedure serves to continuously atomize the liquid mixture while guaranteeing its total combustion and the formation of the colloidal silica with stoichiometric yield.

It was in fact observed that by proceeding as in example 4, that is by spraying with compressed air, at the end of the spraying the quantity of oxygen available in the chamber for combustion could become insufficient, causing the formation of carbonaceous residues (soot) and a lower grade colloidal silica.

EXAMPLE 6

To have a greater spraying fluidity, the mixture consists this time of tetraethylorthosilicate (TEOS) (70%) and heptane (30%). It is sprayed with compressed air, as in example 3, into a chamber at 1000° C.

Thanks to the spraying of very fine droplets, the combustion is instantaneous; the colloidal silica cloud reaches the entire volume of the chamber to be treated and infiltrates into the microcracks of the refractory walls.

EXAMPLE 7

To accelerate the densification, or even the vitrification of the treated surface, the mixture of example 3 received an addition of finely ground talc (10%) and kaolinite (10%), kept in suspension in the liquid mixture by mechanical stirring. Its spraying at high temperature into the chamber led to the formation of a uniform silica deposit, which densifies more easily.

It must be understood that the present invention is in no way limited to the embodiments described above and that modifications can be made thereto while remaining within the scope of the appended claims.

The invention claimed is:

1. A method for treating a chamber having refractory walls, comprising:
   a spraying into said chamber, in the presence of oxygen, of a treatment composition comprising
   at least one organosilicon compound forming a majority portion by weight of said composition and
   at least one hydrocarbon capable, in the presence of oxygen, of giving rise, at a first temperature, to an exothermic reaction, and
   a rise in temperature of said sprayed treatment composition to at least said first temperature,
   characterized in that the spraying in the presence of oxygen takes place in the closed chamber where the treatment composition, in a predominantly liquid state, is atomized in the form of suspended particles,
   and in that the method further comprises
   during said exothermic reaction, a decomposition of said at least one organosilicon compound with formation of a colloidal silica aerosol in the closed chamber and the establishment of an overpressure therein, and
   a spreading of a colloidal silica layer on the refractory walls of said chamber with, following said overpressure, penetration of the colloidal silica into the microcracks of the refractory walls.

2. The method as claimed in claim 1, characterized in that it comprises, after said spreading, a rise in temperature of the chamber to a second temperature higher than the aforesaid first temperature and densification of said colloidal silica which has been spread in a layer on the refractory walls of the chamber and which has penetrated into said microcracks.

3. The method as claimed in claim 1, characterized in that the refractory walls of the chamber separate said chamber from an external volume and in that the method further comprises, during said spraying into the closed chamber, a pressurizing of this external volume to a pressure lower than the pressure of the chamber having refractory walls which favors said penetration of colloidal silica into said microcracks.

4. The method as claimed in claim 3, characterized in that said external volume consists of at least one combustion compartment and in that the method comprises, before said spraying, a pressurizing of said at least one combustion compartment to a pressure higher than that of the chamber having refractory walls and an inspection, therein, of a presence of brands issuing from said at least one combustion compartment via microcracks passing through said refractory walls.

5. The method as claimed in claim 1, characterized in that said at least one organosilicon compound is at least partly soluble in said at least one hydrocarbon.

6. The method as claimed in claim 1, characterized in that said at least one organosilicon compound is selected from the group consisting of silicones, siloxanes, organosilicates and siloxysilicates having a linear, cyclic or branched chain, substituted or unsubstituted, polymerized or unpolymerized, and the mixtures thereof.

7. The method as claimed in claim 1, characterized in that said at least one organosilicon compound is substituted by at least one alkyl or aryl property of the group.

8. The method as claimed in claim 1, characterized in that said at least one hydrocarbon is selected from aliphatic or aromatic hydrocarbons.

9. The method as claimed in claim 8, characterized in that said at least one hydrocarbon is selected from the group consisting of hexane, cyclohexane, heptane, benzene, toluene, xylene and mixtures thereof.

10. The method as claimed in claim 1, characterized in that said treatment composition further comprises at least one additive selected from the group consisting of talcum powder, lime, kaolinite, and silica fume.

11. The method as claimed in claim 1, characterized in that the treatment composition comprises
   a) 50 to 90% by weight of said at least one organosilicon compound,
   b) 10 to 50% by weight of said at least one hydrocarbon, and
   c) 0 to 20% by weight of at least one additive commonly used in the treatment of refractory substrates,
   the sum of the percentages of a) to c) giving 100% by weight.

12. The method as claimed in claim 1, characterized in that the treatment composition has a kinematic viscosity lower than or equal to 100 cSt ($10^{-4}$ $m^2 \cdot s^{-1}$).

* * * * *

UNITED STATES PATENT AND TRADEMARK OFFICE
CERTIFICATE OF CORRECTION

PATENT NO. : 8,372,479 B2  
APPLICATION NO. : 12/667807  
DATED : February 12, 2013  
INVENTOR(S) : Osvaldo Di Loreto Page 1 of 1

It is certified that error appears in the above-identified patent and that said Letters Patent is hereby corrected as shown below:

On the Title page, Item (73) should read as follows

(73) Assignee: FIB-Services Intellectual S.A., Luxembourg (LU)

Signed and Sealed this  
Twentieth Day of August, 2013

Teresa Stanek Rea  
*Acting Director of the United States Patent and Trademark Office*